United States Patent Office 3,288,707
Patented Nov. 29, 1966

3,288,707
DEWATERING AQUEOUS SUSPENSIONS
Marvin J. Hurwitz, Elkins Park, and Herbert Aschkenasy, Levittown, Pa., assignors to Rohm & Haas Company, Philadelphia, Pa., a corporation of Delaware
No Drawing. Filed Dec. 3, 1964, Ser. No. 415,776
7 Claims. (Cl. 210—54)

This application is a continuation-in-part of application Ser. No. 254,585, filed January 29, 1963.

This invention is concerned with the treatment of aqueous suspensions of finely divided water-insoluble solid materials, such as minerals or organic matter, to facilitate the removal of water therefrom by such processes as filtration, centrifugation, sedimentation and decantation, and variations thereof in which the water remains in liquid phase throughout such removal. It is particularly concerned with the treatment of such aqueous suspensions with improved flocculating agents which increase the filtration rate of the suspensions. Settling rates of the suspended matter and clarity of the supernatants are also markedly increased.

In numerous mineral dressing operations, it is necessary to separate water from an aqueous suspension of inorganic or mineral matter, such as clays, finely divided precipitates, and the like, having an extremely fine state of sub-division from less than one micron to about 50 microns which suspension may have a pH between about zero and about 10.5 and frequently is either highly acid such as at a pH of 4 or less or highly alkaline at a pH of 9 or more. Settling of suspended matter from such suspensions is extremely slow so that it is generally the practice to add a flocculating agent, such as glue, acids, starches, and various natural gums, to cause the individual particles to flocculate by some interaction with the molecules of the flocculating agent in order to reduce the holding time in settling basins or vessels before decantation of the supernatant liquor can be carried out. Suspensions of organic matter, such as sewages of domestic and industrial types are also difficult to filter and have slow settling rates. Similarly, removal of water from such suspensions by filtration is frequently aided by the addition of a flocculant to avoid the rapid development of an impermeable filter cake through which filtration can be effected only at extremely slow rates and/or under extremely high pressures.

In accordance with the present invention, it has been found that effective flocculation of suspended matter in aqueous media can be obtained by the addition to such an aqueous suspension at a temperature from room temperature up to just below the boiling point of the suspension of a small amount of a water-soluble polymer, having a high molecular weight from about 10,000 to 10,000,000, viscosity average, and having an exclusively carbon-atom "backbone" chain to which there are attached a plurality of nitrogenous rings of the formula

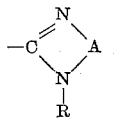

(I)

wherein:

A is an alkylene group having from 2 to 6 carbon atoms, of which 2 to 3 only extend in a chain between the adjoined N atoms, and R is selected from the group consisting of H, $(C_1-C_6)$-alkyl, cyclohexyl, hydroxyl-substituted $(C_1-C_6)$ alkyl groups and groups of the formula $—(ANH)_xH$ wherein A is as defined above and $x$ is an integer having a value of 1 to 4.

In the water-soluble polymer, the nitrogenous rings may be connected directly to carbon atoms in the polymer chain or they may be connected through a phenylene group or through an ester or amide linkage. Thus, the typical polymerized unit of the polymers used in carrying out the present invention may in most cases be represented generically by the following formula

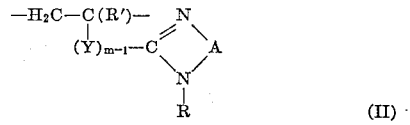

(II)

wherein:

A and R are as defined hereinbefore,

R' is selected from the group consisting of H and $(C_1-C_2)$-alkyl, phenyl, $C_7$-alkaryl, and

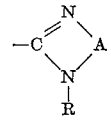

$m$ is an integer having a value of 1 to 2 and,

Y is selected from the group consisting of phenylene,

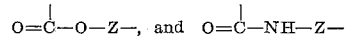

wherein Z is a $(C_1-C_4)$alkylene group.

The preferred polymers are those in which each unit of Formula II contains only 5 to 8 carbon atoms, and optimum results are obtained with polymers in which such units contain only 5 carbon atoms, that is units of 2-vinyl-imidazoline-2.

To assure water-dispersibility of the polymers, the number of carbon atoms in each unit of Formula II should not exceed 12 carbon atoms. In general, the polymers used in accordance with the present invention contain at least 50 mole percent of units of Formula II and preferably about 90 to 100 mole percent thereof.

Preferred polymers are those containing 50 to 100 mole percent of units of the formula

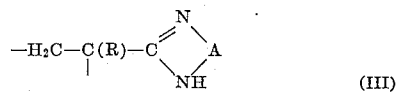

(III)

wherein:

R is selected from the group consisting of H and $CH_3$ and
A is a $(C_2-C_3)$-alkylene group having at least 2 carbon atoms extending in a chain between adjoined N atoms. Preferred species include the polymers containing 50 to 100 mole percent of units of the formula

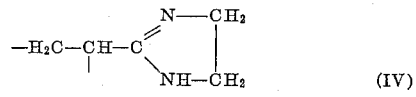

(IV)

which contain 2-imidazoline groups, or of the formula

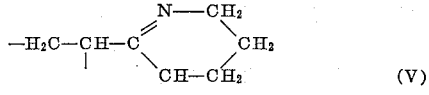

(V)

which contain 3,4,5,6-tetrahydropyrimidine groups, or of the formula

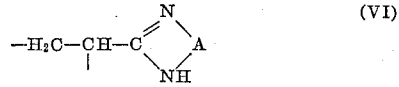

(VI)

in which A is the propylene group $(—CH_2CH(CH_3)—)$ and which contain C-methyl-substituted imidazoline-2 groups, or more specifically 4(or 5)-methyl-2-imidazoline groups.

The polymers containing units of Formula II are obtained by reacting, in the ways disclosed in copending U.S. application for patent Serial No. 254,585, filed January 29, 1963 (in the hands of a common assignee), an amine of the Formula VII with a polymer of a nitrile-containing monomer.

$$HN(R)—(ANH)_xH \qquad (VIII)$$

wherein R, A, and $x$ are as defined hereinbefore. Examples of the amines include Ethylenediamine
Propylenediamine (i.e. 1,2-propanediamine)
Trimethylenediamine (i.e. 1,3-propanediamine)
N-methyl-ethylenediamine
N-butyl-ethylenediamine
N-cyclohexyl-ethylenediamine
N-hydroxyethyl-ethylenediamine
N-(2-hydroxypropyl)-propylenediamine
Diethylenetriamine
Dipropylenetriamine
Di-(trimethylene)-triamine
Triethylenetetraamine
Tetraethylenepentamine The polymers to be reacted with the amine of Formula VII include the homopolymers and copolymers of any polymerizable ethylenically unsaturated monomer containing at least one nitrile group. Examples of these monomers include Acrylonitrile
Methacrylonitrile
Vinylidene cyanide
1-cyanomethyl acrylate and methacrylate
1-cyanoethyl acrylate and methacrylate
2-cyanoethyl acrylate and methacrylate
1-cyanopropyl acrylate and methacrylate
2-cyanopropyl arcylate and methacrylate
3-cyanobutyl acrylate and methacrylate
N-(1-cyanomethyl)-acrylamide and -methacrylamide
N-(2-cyanoethyl)-acrylamide and -methacrylamide
N-(1-cyanopropyl)-acrylamide and -methacrylamide
N-(2-cyanobutyl)-acrylamide and -methacrylamide
α-Cyanostyrene
o-Cyanostyrene
m-Cyanostyrene
p-Cyanostyrene
p-Methyl-α-cyanostyrene
p-Methyl-o-cyanostyrene
o-Methyl-p-cyanostyrene
1-cyanobutadiene
2-cyanobutadiene
Methyl α-cyanoacrylate
Butyl α-cyanoacrylate
N-(2-cyanoethyl)-acrylamide
N-(2-cyanoethyl)-α-cyanoacrylamide
N-(2-cyanoethyl)-methacrylamide The method of preparation of the polymeric deposition aids of the present invention, is not per se claimed as part of the present invention. The disclosure of Serial No. 254,585, in regard to the making of these polymers is incorporated herein by reference.

It is essential that the polymer salts to be used as flocculation aids be of water-soluble character. This term is meant to include both true solubility as well as that type of dispersibility in water characteristic of high molecular weight molecules, such as result in the so-called colloidal solutions or dispersions. The most efficient polymer salts are generally those having the highest hydrophilicity. Thus, the product obtained by reacting polyacrylonitrile of a molecular weight in the range of 500,000 to 10,000,000 viscosity average with at least an amount of ethylenediamine equivalent to the nitrile groups of the polymer so that the nitrile groups are replaced by imidazoline groups constitutes a perffered species.

However, any water-soluble salt of a polymer containing units of Formula II having a molecular weight in the range of about 10,000 to 10,000,000 is capable of serving the purposes of the invention. The nitrile-containing polymer from which the flocculation aid is obtained may thus be a copolymer of the unsaturated nitrile-containing monomer with up to 40 mole percent (or sometimes even up to 50 mole percent) of vinyl esters of fatty acids, such as vinyl acetate, vinylaromatic hydrocarbons, such as styrene and vinyltoluenes, esters of acrylic or methacrylic acid with a saturated aliphatic alcohol having 1 to 18 carbon atoms, such as ethyl acrylate, butyl acrylate, or methyl methacrylate. The nitrile-containing monomer may be copolymerized with hydrophilizing monomers, such as acrylamide, methacrylamide, N-methylolacrylamide, β-hydroxyethyl acrylate, 4-vinylpyridine, dimethylaminoethyl methacrylate, and glycidyl acrylate. Such monomers may compensate for the tendency of other monomers or of hydrophobic constituents of the units of Formula II to reduce the water-dispersibility of the polymeric flocculation aid.

All of the nitrile groups in the nitrile-containing polymer are converted into groups of Formula I.

The acids that may be used to convert the polymer containing units of Formula II to the salt form may be any organic or inorganic acid or acid salt. The acid is preferably a strong acid. Examples include

| | |
|---|---|
| hydrochloric | p-toluene sulfonic |
| hydrobromic | phosphoric |
| hydroiodic | sodium acid phosphates |
| sulfuric | nitric |
| ammonium sulfate | acetic |
| sodium bisulfate | oxalic |
| potassium bisulfate | propionic |
| monomethyl hydrogen sulfate | tartaric |
| sulfurous | citric |
| sodium bisulfite | sulfamic |
| sulfonic | glycolic |
| benzene sulfonic | diglycolic |
| | ethylenediamine-tetraacetic |

The term salt herein is intended to embrace not only the ordinary salts formed with acids, such as those just mentioned, but also such quaternary ammonium salts, formed by quaternizing the >NR groups of one or more of the units of Formula II in the polymer, as are still water-soluble. Alkylating agents which do not detrimentally affect the water-solubility of the polymers are preferably used, such as methyl chloride, methyl bromide, ethyl chloride, dimethyl sulfate, dimethyl sulfite, and dimethyl phosphite. The alkylation may be effected by heating a mixture of the polymer and the alkylating agent in a suitable solvent and, if necessary, under pressure (as in the case of methyl chloride or bromide) at a temperature of 40 to 130° C., such as at reflux at the pressure used. Suitable solvents include alcohols, such as absolute ethanol, and isopropanol, acetonitrile, dimethylformamide, and nitropropane. The mixture may be heated for a half hour or more depending on the temperature and the extent of alkylation desired.

While the polymer containing groups of Formula I may be used in free base form, it is preferably used in the salt form, either the simple salt with an acid or the quaternary salt. In the following general description, reference to a "salt" of the polymer is intended, unless specifically noted otherwise, generically to embrace both the simple salts of the polymers with acids and the quaternary ammonium salts thereof. Wherever hereinbelow it is recommended to use a salt, it is to be understood that the polymer containing groups of Formula I in free base form may be used with equivalent results, and this is especially true when the aqueous medium to be treated is of acid pH since in such a medium, the polymer is immediately converted to the acid salt form.

"Water-soluble" as used herein is intended to include polymers which produce true-solutions or colloidal solutions when they are present in the aqueous media in the small proportions hereinafter specified.

The effectiveness of the polymers of the present invention for the flocculation of predominantly organic matter from aqueous suspensions thereof, such as from sewage sludges is surprising and quite remarkable in view of the fact that many other types of polymers, such as guar gum, polyacrylamide, and the partial calcium salt of the copolymer of vinyl acetate with a maleic acid-half ester, have relatively little flocculating effect upon such aqueous suspensions of organic matter as sewage sludges, so that the practice in most conventional operations remains to use in organic materials, generally a combination of ferric chloride and lime, for the treatment of such sludges. A large proportion of the inorganic treating materials are used amounting to from 2% to 10% of ferric chloride in conjunction with about 5% to 12% of lime. A quite common practice is to use a mixture of 3% ferric chloride and 6% lime based on suspended solids.

To carry out the process of the invention, there is added to and mixed into the aqueous suspension which may be acid, neutral or alkaline such as from a pH of 0 to about 10.5 and may contain up to about 60% by weight of suspended matter (either of mineral or of predominantly organic character) to be flocculated from 0.001% to 5% by weight, based on the weight of the suspended matter, of the water-soluble linear polymer hereinabove defined when the suspended matter is essentially mineral in character and from 0.001% to 5% by weight of the polymer, based on the weight of suspended matter when it is of predominantly organic character, as in the case of a sewage sludge. By the present invention, it is possible to obtain a dried filter cake of digested sludge which has no iron contamination and which may consequently be expected to be a more widely useful fertilizer.

The precise amount of flocculant added may depend upon the particular system and frequently depends upon the size of the particles to be flocculated or the surface area thereof. For example, bentonite particles have extremely high surface areas and, when the suspended matter contains a large proportion thereof, the suspensions require, apparently on that account, as much as 1% to 3% by weight (based on the weight of suspended matter) of the flocculating agent to produce optimum results. For most systems encountered in ore-dressing operations, however, the preferred proportions of flocculant are from 0.01 to 0.2% by weight of the suspended matter.

The flocculants of the present invention are characterized by high efficiency in the range of pH values of many acidic suspensions obtained in ore dressing operations involving acid treatment, as in the leaching of ores with acid or in the dissolving of a desired mineral by the acidification of the products of alkaline fusions of the ore or mineral. The pH may range from a value of 4 down to the lowest pH values practically attainable in the neighborhood of zero.

The flocculants of the present invention are also effective in the range of pH values from 9 to 14 which is characteristic of the alkaline suspensions obtained in ore-dressing operations involving alkaline treatment, as in the leaching of ores with an alkali, such as sodium or potassium carbonate or in the dissolving of a desired mineral from the products of alkaline fusions of the ore or mineral.

When used in the alkaline systems, the groups of Formula I gradually hydrolyze to form aminoalkylamide groups of the formulas

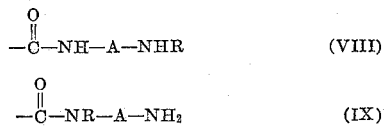

wherein A and R are as defined hereinbefore. This hydrolysis does not occur so rapidly in systems at a pH below 9 as to detrimentally affect the flocculating efficiency of the agents of the present invention although there may be present in the flocculated systems a small proportion of these hydrolysis products.

The flocculants of the present invention are applicable in ore-dressing operations where finely divided insoluble chemical precipitates or suspended materials are formed or present in acid or alkaline suspensions or where acid or alkaline solutions of substances to be recovered contan suspended therein finely divided water-insoluble mineral or inorganic substances. The flocculants are generally effective regardless of the concentration of the suspended material in the suspension provided only that the suspension has sufficient mobility or fluidity to allow intimate and thorough mixing of the flocculant throughout its body.

In various mineral dressing operations in metallurgical industries, finely-divided insoluble inorganic material is frequently present as suspended matter in aqueous alkaline systems, and it is frequently necessary to remove such material by a sedimentation and decantation procedure or by a filtration procedure. Examples of such suspended materials include calcium silicate, silica, and calcium sulfate. In such systems, from 0.1% to 0.2% of one of the flocculants of the present invention is added before settling or before filtration to hasten the settling and thereby reduce hold-up time in the settling tanks or basins, and, in the case of filtration, to increase the rate of filtration with or without a reduction of the pressure necessary to effect the filtration.

In metallurgical industries, also, ores containing the desired mineral are generally ground or otherwise reduced to small particle size. In such systems, it is frequently necessary to produce extremely finely-divided particles to facilitate solution in acids, such as in hydrochloric, nitric, or sulfuric acid, or in alkalies, such as in sodium or potassium carbonate or hydroxide, of the desired mineral component, and the handling of the acid or alkaline aqueous suspensions containing such particles is aided by the addition to such suspensions of flocculating agents of the present invention in the proportions given above. The flocculating agents of the present invention are applicable to a wide variety of suspensions of minerals and ore pulps obtained in such metallurgical industries. For example, the flocculants of the present invention are advantageous for addition to the suspensions obtained from the alkaline-leaching of gold and uranium ores, for addition to alkaline phosphate tailings suspensions that are formed during the manufacture of calcium phosphate, and for addition to sodium carbonate and sodium bicarbonate, liquors contaminated with small amounts of siliceous material. The flocculants of the present invention are also extremely advantageous for addition to such suspensions as are obtained as the result of the acid leaching of gold ores, copper ores, copper flotation concentrates, copper tailings, and copper residues, those obtained from acid-leached bauxite ores, acid-leached vanadium ores, acid-leached zinc sulfide concentrates, acid-leached cyanidation tailings containing pyrite, gold and uranium-bearing materials, acidic titanic sulfate digestion residues from crude titaniferous materials such as ilmenite ore concentrates, etc., as well as acetic suspensions of various ores and minerals such as zinc refinery sludges, flotation products, zirconium oxide, iron oxide slimes, etc.

Also, the flocculating agents of the present invention are useful for facilitating the dewatering of many aqueous suspensions of organic materials whether the suspended matter is entirely organic or is a mixture of organic with inorganic materials in which the organic portion predominates by weight. Examples of such aqueous suspensions include industrial wastes, such as that discharged from dairies and canneries, distillery wastes, fermentation wastes, wastes from paper-manufacturing plants, wastes from dyeing plants, sewage suspensions such as any type of sludge derived from a sewage treatment plant, such as a digested sludge, an activated sludge, a raw or primary sludge or mixtures thereof. The filtration and sedimentation of such waste materials are generally complicated by the fact that they are rather complex in character and may include combinations of finely divided organic and/or inorganic materials which are relatively inert in conjunction with finely divided hydrophilic organic matters which are in swollen condition and thereby tend to interfere with filtration and make the drying of either a filter cake or sediment cake practically impossible. They may also contain, besides hydrophilic polymeric materials, which swell and give the difficulties just mentioned, surface active agents such as detergents, dispersing agents and protective colloid agents, all of which tend to maintain the material in suspended condition and enhance the problems encountered in filtering and/or sedimentation.

The concentration of predominantly organic suspended matter may be from 0.1% to 50% but is generally in the range of 0.10% to 10% concentration by weight in the aqueous suspensions to be treated. It has been found that flocculation of the suspended predominantly organic matter can be readily effected by incorporating and mixing into the suspension a small proportion, on the order of 0.01% to 5% by weight (based on the weight of suspended matter), of the flocculating agents defined hereinabove. Frequently, the preferred proportion giving the greatest efficiency is in the range of about 0.1% to 0.35% of the flocculating agent on the total weight of suspended matter. Generally, this is the preferred range for such difficult suspensions as sewage sludges.

After introduction of the flocculating agent, the suspension may be allowed to settle and then decanted or the suspension may be filtered or centrifuged. The use of the flocculating agents of the present invention has been found to increase the filtration rate and the sedimentation rate.

The flocculating agents of the present invention may also be used to remove the mud accumulated in ballast tanks of ships and barges. For this purpose, an equeous solution containing about 0.1 to 1% of the flocculating agent may be introduced into the ballast tank above the sediment therein. Rocking of the tank by the action of waves on the barge or ship disperses the mud or sediment so that it can be pumped out. Repeated treatments may be needed to complete the sediment removal. The flocculating agents may also be used to remove mud deposits from heat-exchange systems wherein river water or other dirty water is used as the cooling medium. An aqueous solution of the flocculant is forced through the exchangers or boilers at a high flow rate to sweep the mud suspended by the agent through and out of the system. After such cleaning, the systems may be kept free of deposits by including a small amount of the flocculant in the river water used for cooling, etc.

To assist those skilled in the art to practice the present invention, the following modes of operation are suggested by way of illustration, parts and percentages being by weight and the temperatures in °C. unless otherwise specifically noted.

(1a) A suspension of 8.85 parts of a copolymer of acrylonitrile and ethyl acrylate (60:40 weight percent) containing 5.306 parts (0.1 mole) of acrylonitrile in 60.1 parts (1 mole) of ethylenediamine containing 0.212 part of sulfur (4% based on the weight of acrylonitrile) is heated with stirring under nitrogen at a temperature of 105°–110° C. for four hours. Upon the lapse of that time, 95% of the theoretical quantity of ammonia has evolved. The vinylimidazoline copolymer product is isolated by precipitation with acetone as a solid which is soluble in water.

(b) Treatment of 100 ml. suspensions containing 10% of Rutgers soil (Rutgers soil is 20% sand, 58% silt, 22% clay) with 0.25% based on the weight of the solids of the product of part (a) hereof causes an improvement in the settling of the soil and an increase in the sediment volume.

(2a) A suspension of 18.03 parts of a copolymer of acrylonitrile and styrene (58.9:41.1 weight percent) containing 10.6 parts (0.2 mole) of acrylonitrile in 120.2 parts (2 mole) of ethylenediamine containing 0.424 part of sulfur (4% based on the weight of acrylonitrile) is heated with stirring under nitrogen at a temperature of 105°–110° C. At the end of eighteen hours, 107% of the theoretical amount of ammonia is evolved. The vinylimidazoline copolymer product is a solid which is soluble in water.

(b) When an activated sludge suspension containing 6,000 p.p.m. of suspended solids is treated with 0.10–1.0%, based on the weight of suspended solids, of the product of part (a) hereof, rapid flocculation and settling of the solids occur and clear supernatants are obtained.

(3a) A suspension of 19.9 parts of a copolymer of acrylonitrile and acrylamide (53.3:46.7 weight percent) containing 10.6 parts (0.2 mole) of acrylamide in 120.2 parts (2 mole) of ethylenediamine containing 0.424 part of sulfur (4% based on the weight of the acrylonitrile) is heated with stirring under nitrogen at a temperature of 105°–110° C. for twenty-five and a half hours, there is recovered 175% of the theoretical amount of ammonia. The vinylimidazoline copolymer product is soluble in water.

(b) The filtration of 10% clay slurries is improved by the addition of 0.05 to 0.1% by weight, based on the weight of the clay, of the product of part (a) hereof.

(4a) A suspension of 12.18 parts of a copolymer of acrylonitrile and vinyl acetate (87.1:12.9 weight percent) containing 10.6 parts (0.2 mole) of acrylonitrile in 120.2 parts (2 mole) of ethylenediamine containing 0.424 part of sulfur (4% based on the weight of acrylonitrile) is heated with stirring under nitrogen at a temperature of 105°–110° C. for three hours and twenty minutes. Upon the lapse of that time, 102% of the theoretical quantity of ammonia has evolved. The vinylimidazoline copolymer product is a solid which is soluble in water.

(b) Portions of 100 cc. of digested sewage sludge containing 1 to 5% of suspended solids and having a pH of 7.0, when treated with 1 to 5%, based on the weight of suspended solids, of the product of part (a) hereof undergo a rapid settling of the supsended solids and clarification of the liquid.

(5) The effectiveness of several polymeric flocculating agents of the present invention for the clarification of waters which are turbid because of solids suspended therein may be determined in the following way using two-liter beakers equipped with stopcocks for removing samples two inches from the bottom. Two waters were tested, one having an initial turbidity of 210 p.p.m. solids and the other, 157 p.p.m. solids. While stirring these waters in the beakers using an agitator operating at 100 r.p.m., 25 p.p.m. of alum, based on the weight of the suspension, is added over a period of about 30 seconds. One beaker each of the two different alum-treated waters is allowed to settle 30 seconds, the supernatants drawn off through the stopcocks and the residual solids (turbidity) is measured. Stirring is continued in the rest of the beakers after addition of the alum is completed, this being considered zero time; one minute later various amounts of polymeric flocculating agent (or coagulant aid) are added to separate beakers. In some of these beakers to which coagulant aid has been added and which contain the alum-treated water initially containing 210 p.p.m. suspended solids, 15 p.p.m. of clay (on weight of suspension) is added after 3 minutes of stirring (from said zero time). In all the beakers stirring at 100 r.p.m. is continued for a total of five minutes after the alum addition, whereupon it is reduced to 30 r.p.m. Stirring at 30 r.p.m. is continued for 15 minutes, then stopped, and samples are removed through the stopcock after 30 seconds. The turbidity of these samples is measured on a Hellige turbidimeter after shearing with a Hamilton Beach mixer.

The following table summarizes the results determined on the two waters treated with alum alone; on the second water treated with alum and 0.2, 0.3, and 0.4 p.p.m. based on weight of suspension, of a flocculating agent of the present invention in comparison with the same alum-treated water but using 0.2, 0.3, and 0.4 p.p.m. of a commercially available cationic flocculant; on the first water treated with alum and 0.2 and 0.3 p.p.m. of each of several flocculating agents of the present invention in comparison with the same alum-treated water and 0.2 and 0.3 p.p.m. of each of two different commercially available cationic flocculants; and on the first water treated with alum and 0.1 and 0.2 p.p.m. of each of several flocculating agents of the present invention and clay in comparison with the same alum-treated water and 0.1 and 0.2 p.p.m. of each of the same commercially available flocculants and clay.

TABLE I

| Test Water | 1 | 1 | 2 |
|---|---|---|---|
| Initial turbidity (p.p.m. suspended solids) | 210 | 210 | 157 |
| Alum (p.p.m.) | 25 | 25 | 25 |
| Turbidity (p.p.m. suspended solids at 0.5 min. settling time after adding alum) | 74 | 74 | 55.0 |
| Clay (p.p.m.) | 15 | 0 | 0 |

| See Footnotes | Turbidity (average p.p.m suspended solids) at 0.5 min. settling time after addition of coagulant aid + clay (as indicated in immediately preceding data line) to the alum-treated water | | |
|---|---|---|---|
| | (¹) | (²) | (³) |
| Coagulant aid (compositions given below): | | | |
| 1 | 8.2 | 11.6 | |
| 2 | 9.5 | 9.2 | |
| 3 | 7.9 | 10.6 | 13.3K |
| 4 | 9.0 | 8.4 | |
| 11 (prior art) | 18.1 | 24.2 | 33.5 |
| 12 (prior art) | 19.0 | 16.2 | |

¹ Average of the turbidities of the 0.1, 0.2 p.p.m. coagulant aid treatment.
² Average of the turbidities of the 0.2, 0.3 p.p.m. coagulant aid treatment.
³ Average of the turbidities of the 0.2, 0.3, 0.4 p.p.m. coagulant aid treatment.

The polymeric flocculating agents or coagulant aids used in (5) hereinabove and in subsequent procedures have the following compositions. The viscosity is that of a 1% solution of the polymer in water at 25° C. obtained at 12 r.p.m. in a Brookfield viscometer.

*Coagulant aid 1* is a polyvinylimidazoline having an average molecular weight of 230,000 in free amine form obtained by reacting a polyacrylonitrile having an average molecular weight of 130,000 with excess ethylene diamine in accordance with the procedure of Example 1 in Serial No. 254,585. Viscosity, 5.75 cps.

*Coagulant aid 2* is the hydrochloric acid salt of coagulant aid 1. Viscosity, 18.0 cps.

*Coagulant aid 3* is a polyvinylimidazoline having an average molecular weight of 900,000 in free amine form obtained by reacting a polyacrylonitrile having an average molecular weight of 500,000 with excess ethylene diamine in accordance with the procedure of Example 1 in Serial No. 254,585. Viscosity, 19.2 cps.

*Coagulant aid 4* is the hydrochloric acid salt of coagulant 3. Viscosity, 154.0 cps.

*Coagulant aid 5* is a polyvinylimidazoline having an average molecular weight of 2.7 million in free amine form obtained by reacting a polyacrylonitrile having an average molecular weight of about 1.5 million with excess ethylenediamine by the procedure of Example 1 in Serial No. 254,585. Viscosity, 15.0 cps.

*Coagulant aid 6* is the hydrochloric acid form of coagulant aid 5. Viscosity, 1550.0 cps.

*Coagulant aid 7* is the free amine form of a copolymer of 33% by weight of styrene and 67% by weight of vinylimidazoline obtained by reacting excess ethylenediamine with a styrene/acrylonitrile copolymer by the process of Example 10 of Serial No. 254,585. Viscosity, 8.5 cps.

*Coagulant aid 8* is the free amine base form of poly-(vinyl)tetrahydropyrimidine having an average molecular weight of about 270,000 obtained by reacting a polyacrylonitrile having an average molecular weight of about 131,000 with excess 1,3-propanediamine by the process of Example 16 of Serial No. 254,585. Viscosity, 2.5 cps.

*Coagulant aid 9* is the free amine base form of a copolymer of 46.7% by weight of acrylamide and 53.3% by weight of vinylimidazoline obtained by reacting exvess ethylenediamine with an acrylamide/acrylonitrile copolymer by the process of Example 12 of Serial No. 254,585. Viscosity, 4 cps.

*Coagulant aid 10* is the free amine base form of a copolymer of 12% by weight of vinyl acetate and 88% by weight of vinylimidazoline obtained by reacting excess ethylenediamine with a vinyl acetate/acrylonitrile copolymer by the process of Example 13 of Serial No. 254,585. Viscosity, 5.25 cps.

*Coagulant aid 11* is a commercial prior art condensation product of epichlorohydrin and a hexamethylene diamine. Viscosity 1.25 cps.

*Coagulant aid 12* is an ethylene oxide derivative of coagulant aid 11. Viscosity 1.50 cps. A prior art product.

*Coagulant aid 13* is a commercial prior art product. It is a high molecular weight polyacrylamide. Viscosity, 80 cps.

*Coagulant aid 14* is a commercial prior art product. It is a high molecular weight copolymer of 90% by weight of acrylamide with 10% by weight of dimethylaminoethyl methacrylate. Viscosity, 1600 cps.

*Coagulant aid 15* is the free amine base form of a poly(2-vinyl-4(or 5)-methylimidazoline-2) having an average molecular weight of 270,000 obtained by the reaction of excess 1,2-diaminopropane with polyacrylonitrile having an average molecular weight of 131,000 by the process of Example 17 of Serial No. 254,585. Viscosity, 5.0 cps.

*Coagulant aid 16* is the free amine base form of a copolymer of 27% by weight of ethyl acrylate and 73% by weight of vinylimidazoline obtained by the reaction of excess ethylenediamine with an ethyl acrylate/acrylonitrile copolymer by the process of Example 7 of Serial No. 254,585. Viscosity 1.75 cps.

*Coagulant aid 17* is the free amine base form of a copolymer of 6.5% by weight of vinylidene chloride and 93.5% by weight of vinylimidazoline obtained by the reaction of excess ethylenediamine with a vinylidene chloride/acrylonitrile copolymer by the process of Example 28(a) of Serial 254,585. Viscosity, 1.6 cps.

*Coagulant aid 18* is the free amine base form of a copolymer of 25% by weight of trimethylcyclohexyl acrylate and 76% by weight of vinylimidazoline obtained by the reaction of excess ethylenediamine with a trimethylcyclohexyl acrylate/acrylonitrile copolymer by the process of Example 24(a) of Serial No. 254,585. Viscosity, 5.6 cps.

*Coagulant aid 19* is the free amine base form of poly-(2-vinyl-3-methylimidazoline-2) having an average molecular weight of 270,000 obtained by the reaction of excess N-methylethylenediamine with a polyacrylonitrile having an average molecular weight of 131,000 by the process of Example 18(a) of Serial No. 254,585. Viscosity, 3.25 cps.

*Coagulant aid 20* is the free amine base form of a copolymer of 23% by weight of vinyl butyl ether and 77% by weight of vinylimidazoline obtained by the reaction of excess ethylenediamine with a vinyl butyl ether/acrylonitrile copolymer by the process of Example 14 of Serial No. 254,585. Viscosity, 9.8 cps.

(6) Table II gives specific data on which the first two columns of Table I are based. The water initially has a turbidity of 210 p.p.m. suspended solids and a pH of 7.45 and in each instance, the water sample is first treated with 25 p.p.m. of alum before the coagulant aid, and then the clay, if used, is added.

TABLE II

| Coagulant Aid | P.p.m. of Aid | P.p.m. Clay | P.p.m. Alum | Residual turbidity (p.p.m. suspended solids) at conclusion 0.5 minute settling time |
|---|---|---|---|---|
| 1 | 0.1 | 15 | 25 | 13 |
| 2 | 0.1 | 15 | 25 | 14 |
| 3 | 0.1 | 15 | 25 | 12 |
| 4 | 0.1 | 15 | 25 | 14 |
| 11 (Prior Art) | 0.1 | 15 | 25 | 22.5 |
| 1 | 0.2 | 15 | 25 | 3.5 |
| 2 | 0.2 | 15 | 25 | 5.0 |
| 3 | 0.2 | 15 | 25 | 3.8 |
| 4 | 0.2 | 15 | 25 | 4.0 |
| 11 (Prior Art) | 0.2 | 15 | 25 | 13.8 |
| 1 | 0.2 | 0 | 25 | 14.0 |
| 2 | 0.2 | 0 | 25 | 11.0 |
| 3 | 0.2 | 0 | 25 | 12.0 |
| 4 | 0.2 | 0 | 25 | 9.2 |
| 11 (Prior Art) | 0.2 | 0 | 25 | 27.5 |
| 1 | 0.3 | 0 | 25 | 9.2 |
| 2 | 0.3 | 0 | 25 | 7.5 |
| 3 | 0.3 | 0 | 25 | 9.2 |
| 4 | 0.3 | 0 | 25 | 7.5 |
| 11 (Prior Art) | 0.3 | 0 | 25 | 11.0 |

(7) Table III gives the times (in seconds) required for filtration of separate 100 cc. portions (pH=7.6) of an aqueous suspension containing 10 g. of kaolin/100 cc. to which there has been added 0.1%, based on the weight of clay, of the hydrochloride salt of a respective one of the coagulant aids identified by number in the preceding list thereof. The pressure of filtration is 24.3 cms. Hg.

TABLE III

Coagulant aid: Filtration times (sec.)
  None _____ 580
  7 _____ 83
  8 _____ 90
  9 _____ 68
  10 _____ 78
  15 _____ 72
  16 _____ 95
  17 _____ 114
  18 _____ 64
  19 _____ 79
  20 _____ 56

(8) Table IV gives the results obtained when the process of 7) is carried out with the aqueous 10% kaolin suspensions at pH values of 7.0 and 12.0 and with additions of 0.05 and 0.1%, based on the weight of suspended kaolin, of the coagulant aid in hydrochloride form (except 11) and using a Baroid filter press at 4.7 lb./sq. in. pressure.

TABLE IV

| Coagulant Aid | Percent on Solids | Filter Times (Sec.) | |
|---|---|---|---|
| | | pH 7.0 | pH 12.0 |
| None | | 580 | 925 |
| 1 | 0.05 | 76 | 340 |
| 1 | 0.1 | 61 | 210 |
| 2 | 0.05 | 84 | 325 |
| 2 | 0.1 | 52 | 220 |
| 4 | 0.05 | 59 | 170 |
| 4 | 0.1 | 34 | 141 |
| 5 | 0.05 | 65 | 215 |
| 5 | 0.1 | 54 | 136 |
| 11 (Prior Art) | 0.05 | 142 | |
| 11 (Prior Art) | 0.1 | 118 | |
| 13 (Prior Art) | 0.05 | 165 | 450 |
| 13 (Prior Art) | 0.1 | 80 | 195 |

(9) In each of several three-liter beakers about 30 cm. high having their outer walls graduated in cms. there is placed 2800 cc. of a waste activated sludge from a municipal sewage disposal plant containing 4700 p.p.m. suspended solids. To the sludge in one of the beakers, there is added 10 p.p.m., and to that in another 12 p.p.m., based on total sludge weight, of coagulant aid 6. These sludges and a control sludge to which no coagulant is added are stirred for two minutes with an agitator operating at 80 r.p.m. Then, the agitation is stopped and the sediment volume (wall height in cms.) is noted at half-minute intervals, the stopping of the agitation being considered zero time. Table V shows the results which are indicative of the effectiveness of the polyimidazoline in clarifying the sewage sludge.

TABLE V

| Coagulant Aid | P.p.m. Coag. Aid | Sediment Volumes (cms. height) | | | | | |
|---|---|---|---|---|---|---|---|
| | | 0.5 min. | 1 min. | 1.5 min. | 2 min. | 5 min. | 15 min. |
| None | | 17.8 | 17.2 | 16.8 | 16.5 | 14.2 | 10 |
| 6 | 10 | 8 | 8 | 7.5 | 7 | 7 | 6.5 |
| 6 | 12 | 8 | 8 | 7.5 | 7.5 | 7.5 | 7.5 |

(10) Several portions of a digested sewage sludge containing 2.17% of suspended non-volatile solid matter of predominately organic character and having a pH of 7.2 are treated with different amounts of flocculating agents (1 and 2) of the invention, and two portions are treated with ferric chloride ($FeCl_3$) and lime ($Ca(OH)_2$) (both the indicated percentages based on weight of suspended matter) for comparative purposes. The treated portions are then filtered using a vocuum leaf filter provided with a nylon filter cloth (having 0.1 sq. ft. of filter area) at 74° F. under 22 inches Hg vacuum using a 1.0 minute form period, a 2.0 minute drying period, and a 0.5 minute discharge period.

The following Table VI gives the volume (in ml.) of filtrate obtained and the rate of filtration in gallons per hour per square foot of filter surface.

TABLE VI

| Filter Aid | Amount of Aid, Percent on Suspended Solids | Filtrate* Volume Ml. | Rate of Filtration, gal./hr./sq. ft. |
|---|---|---|---|
| None | 0 | 59 | 2.66 |
| $FeCl_3/Ca(OH)_2$ | 11.3/25 | 273 | 12.28 |
| $FeCl_3/Ca(OH)_2$ | 14/31.2 | 375 | 16.87 |
| 1 | 1.75 | 230 | 12.6 |
| 2 | 1.75 | 1,140 | 51.3 |

*The filtrates are clear in all instances.

The data of (9) and (10) show that small amounts of the polymers of the invention are effective in the filtration and clarification of biological sewage sludges. Thus, important savings in filtration time, and thereby, in equipment are realized.

In further experiments with industrial sewage sludges, the polymers of the invention promote settling of large or medium size flocs, a distinct advantage in industrial filtration and operations.

(11) The procedure of (10) is applied to a digested sewage sludge containing 4.0% sludge solids using various coagulant aids as filter aids. Table VII summarizes the results.

TABLE VII

| Coagulant Aid | Amount of Aid, Percent on Suspended Solids | Filtrate* Volume Ml. | Rate of Filtration, gal./hr./sq. ft. |
|---|---|---|---|
| None | | 57 | 2.56 |
| FeCl₂/Ca(OH)₂ | 2.94/13.9 | 140 | 6.3 |
| FeCl₂/Ca(OH)₂ | 3.77/18.9 | 170 | 7.66 |
| FeCl₂/Ca(OH)₂ | 4.73/23.4 | 210 | 9.45 |
| FeCl₂/Ca(OH)₂ | 5.67/28.4 | 230 | 10.3 |
| 1 | 0.39 | 135 | 6.08 |
| 1 | 0.695 | 160 | 7.20 |
| 3 | 0.39 | 160 | 7.2 |
| 3 | 0.695 | 240 | 10.8 |
| 3 | 0.99 | 282 | 12.7 |
| 14 (Prior Art) | 0.695 | 62 | 2.79 |
| 14 (Prior Art) | 1.39 | 84 | 3.78 |

*The filtrates are clear in all instances.

(12a) The methyl bromide quaternary ammonium salt of a polyvinylimidazoline is prepared by dissolving in 250 grams of toluene 95 grams of the free base form of the 2-vinylimidazoline-2 polymer (obtained by reaction of excess ethylene diamine on a polyacrylonitrile having a molecular weight of about three million viscosity average so that the nitrile groups are converted to imidazoline groups such as by the process of Example 1) of Serial No. 254,585, supra, and adding 95 grams of methyl bromide thereto. The mixture is kept at a temperature of about 0 to 5° C. for 48 hours. The mixture is then allowed to reach ambient temperature and is filtered to free the solid quaternary salt from excess solvent.

(b) Zircon sand is fused or fritted with sodium carbonate (about equimolecular proportions) and the sodium silicozirconate formed is dissolved in dilute sulfuric acid at about 105° C. The resulting liquor has a pH less than 0.1 and contains about 6.65% of suspended matter, mainly silicic acid and some insoluble silicates. To recover the soluble zirconium sulfate, this liquor is filtered. The polymer quaternary salt product of part (a) hereof may be added to this liquor before filtration in an amount of 0.3% (on the weight of suspended matter) for the purpose of accelerating the rate of filtration.

(13) Large floccules and a slightly turbid supernatant are obtained by the addition to a very turbid aqueous suspension from a South African diamond mine containing 2.8 grams of montmorillonite clay per 100 cc. of suspension (pH=9.3) of 0.5% (by weight on the clay) of the sodium bisulfate salt of 2-(isopropenyl)-imidazoline-2 (obtained by reaction of excess ethylenediamine on a polymethacrylonitrile having a viscosity average molecular weight of about one million so that the nitrile groups are converted to the imidazoline-2 groups).

(14) Large floccules and a clear supernatant are obtained when 10 p.p.m. of a water-soluble hydrochloric acid salt of a polymer of 2-vinyl-3,4,5,6-tetrahydropyrimidine (obtained by the reaction of excess trimethylenediamine on a polyacrylonitrile having a viscosity average molecular weight of about 600,000 so that the nitrile groups are converted to tetrahydropyrimidine groups) is added to a hot concentrated aqueous carbonate liquor containing suspended siliceous material and having a pH of 9.5. The suspension contains 25.1 grams sodium carbonate per 100 cc., 10.0 grams sodium bicarbonate per 100 cc. and 0.64 gram of insoluble siliceous material per 100 cc. The insoluble material contains by analysis approximately 28.3% SiO₂ and 13% combined oxides and 13.4% calcium oxide.

(15) Similar results are obtained when procedure (13) is repeated using 0.5% (on the weight of clay) of a water-soluble p-toluene-sulfonic acid salt of a polymer of 2-vinyl-4(or 5)-methyl-2-imidazoline (obtained by the reaction of excess 1,2-diaminopropane on a polyacrylonitrile having a viscosity average molecular weight of about 1.7 million so that the nitrile groups are replaced by substituted imidazoline groups).

We claim:

1. The process of facilitating the dewatering of an aqueous suspension of finely-divided water-insoluble solid materials which comprises mixing into such a suspension having a pH of about 0 to about 10, from 0.001% to 5% by weight, based on the weight of suspended matter, of a water-soluble polymer having a molecular weight from about 10,000 to 10,000,000 viscosity average selected from the group consisting of water-soluble polymers, and salts thereof, containing at least 50 mole percent of units of the formula

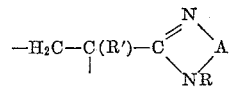

wherein:
A is a (C₂–C₃)-alkylene group having at least 2 carbon atoms extending in a chain between the adjoined N atoms,
R is selected from the group consisting of H and CH₃, and
R' is selected from the group consisting of H and CH₃.

2. A process according to claim 1 which comprises the subsequent step of removing water from the suspension by filtration.

3. A process according to claim 1 which comprises the subsequent step of removing water from the suspension by centrifugation.

4. A process according to claim 1 which comprises the subsequent step of removing water from the suspension by sedimentation and decantation.

5. The process of facilitating the dewatering of an aqueous suspension of finely-divided water-insoluble solid materials which comprises mixing into such a suspension having a pH of about 0 to about 10, from 0.001% to 5% by weight, based on the weight of suspended matter, of a water-soluble polymer having a molecular weight from about 10,000 to 10,000,000 viscosity average of 2-vinylimidazoline-2 in the form of an acid salt thereof.

6. The process of facilitating the dewatering of an aqueous suspension of finely-divided water-insoluble solid materials which comprises mixing into such a suspension having a pH of about 0 to 10, from 0.001% to 5% by weight, based on the weight of suspended matter, of a water-soluble polymer having a molecular weight from about 10,000 to 10,000,000 viscosity average of 2-vinylimidazoline-2 in free base form.

7. The process of facilitating the dewatering of an aqueous suspension of finely-divided water-insoluble solid materials which comprises mixing into such a suspension having a pH of about 0 to 10, from 0.001% to 5% by weight, based on the weight of suspended matter, of a water-soluble polymer having a molecular weight from about 10,000 to 10,000,000 viscosity average of 2-vinylimidazoline-2 in the form of a quaternary ammonium salt thereof.

References Cited by the Examiner

UNITED STATES PATENTS 2,875,062  2/1959  Werner _____ 99—48
2,881,171  4/1959  Hankins _____ 260—88.3 X MORRIS O. WOLK, *Primary Examiner.*

M. E. ROGERS, *Assistant Examiner.*